BASEBALL SCHEDULING METHOD AND MACHINE

Filed June 3, 1966 2 Sheets-Sheet 1

INVENTOR.
Francis M. Hess
BY
Robert A. Halvorsen

Sept. 8, 1970 F. M. HESS 3,526,982

BASEBALL SCHEDULING METHOD AND MACHINE

Filed June 3, 1966

2 Sheets-Sheet 2

INVENTOR.
Francis M. Hess
BY
Robert A. Halvorsen

United States Patent Office 3,526,982
Patented Sept. 8, 1970

3,526,982

BASEBALL SCHEDULING METHOD AND MACHINE

Francis M. Hess, 5341 100th Ave. N., Pinellas Park, Fla.

Filed June 3, 1966, Ser. No. 555,030
Int. Cl. G09f *11/02*
U.S. Cl. 40—68 2 Claims

ABSTRACT OF THE DISCLOSURE

A method for scheduling events involving various pairs of participants at periodic time intervals, comprising the tabulation of a series of different pairs in registry with a tabulation of periodic time intervals.

This invention relates to a method and means for scheduling games played by several teams or players in various cities over a period of several months in a playing season. The principles are particularly adapted to the existing baseball big leagues, but can also be applied to other events outside of the realm of sports.

The baseball schedules provided by both the major league baseball associations over the past few years have been severely criticized by the press as inadequate and not competitive, and for these reasons do not properly promote the interest of the public toward the sport; and in turn serve as the prime reason for declining gate receipts in the waning weeks of the long summer schedule.

The following disclosure covers the development and operation of a scheduling machine, made in response to the above criticisms. By using the schedule developed by the use of this invention more interest in the game will be stimulated and attendance of spectators will increase throughout the season. The machine includes the use of certain basic elements that are applied to the periphery of cylinders, and with the aid of axis and circular motion, are coordinated one with another.

Selective elevation of these cylinders on a common vertical axis provides itinerary accommodation for competitive scheduling and in turn suitable adaptation for calendar orientation. This entire combination adds up to a revolving scheduling machine and by dialing, spells out results that are far superior to other schedules now in use.

A better understanding of these developments, made in contrast to present practice, can be explained with reference to the following charts and models.

Figure 1:
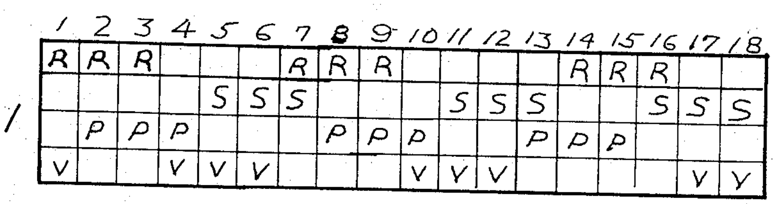
FIGS. 1, 2, 3 and 4 show plan views of flat tapes having a series of letters and numerals which will later be described in detail.

FIG. 1 shows a basic tape, including four horizontal rows of symbols extended to 18 numbered vertical positions and strategically integrated to form a distinct segment in a scheduling pattern. The symbols appear in groups of three which will later be used to indicate the *Home* series. The spacing between groups correspond to road trip absence or *Visiting* team scheduling. The sequence employed in this spacing is a careful alternate use of 4–3–2 and 4–2–3 variations, and regulated so that two symbols are always present in each vertical position, and in the course of 18 positions, all possible combinations of R–S–P–V occur at least once in this multiple listing. This sequence employed also provides that each row will repeat itself in 18 positions and make possible a closed cycle operation later.

This flat tape is then applied to the periphery of a cylinder. The length of tape is exactly equal to the circumference of the cylinder selected. The cylinder in turn is mounted on a vertical axis, and the mounting is such that the cylinder can turn with axis or on axis. Thus the surface of a flat tape is transferred to the endless surface of a cylinder to complete a closed cycle; and with aid of an axle, circular motion is added to the operation, with the help of mechanical means. When this is done, the need for numbered vertical positions for symbols is eliminated, because any position can be moved to the *front* or starting position on the vertical axis, by the mere rotation of the cylinder; and circular motion of tape can be employed in either direction, and with or without axis turning.

Figure 2:
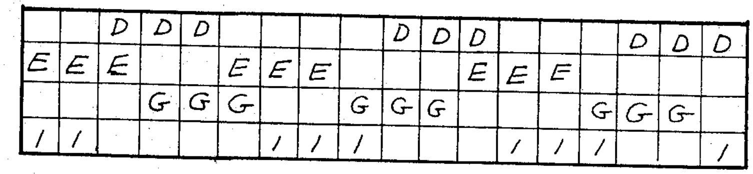
Figure 6:
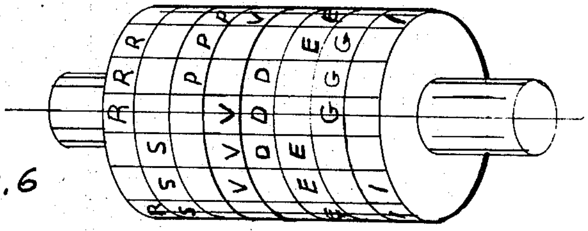
FIG. 6 is an isometric view of one of the cylinders used in the scheduling machine.

FIG. 2 shows another basic tape, using four rows of symbols and spaced similar to FIG. 1. However, the spacing is developed from the opposite end; that is 1–2–3 etc. Spacing in FIG. 2 is identical to 18–17–16 etc. of FIG. 1. Therefore, FIG. 2 will be referred to as a reverse pattern. This tape is applied to a cylinder as before and in turn cylinder is mounted below FIG. 1 on the same axis. Mounting these two tapes on the same axis is made for symbol examination. That is, look for like symbols that reoccur in too many vertical positions. Too much of this can be a headache as a repetitive nuisance. By inspection it will be seen that if position 1 of FIG. 2 is directly beneath position 1 of FIG. 1, excessive repetition occurs and this setting is undesirable. To explore for improved register, D–E–G–1 is rotated clockwise (top view) to successively advance other symbols to the *Front* position for individual inspection. When #4 position of D–E–G–1 is reached, it will be found that a marked improvement is had when registered with #1 position of R–S–V–P. Repetition is reduced to make this register a desirable combination for scheduling purposes. This desired register is shown in FIG. 6.

The circular motion of D–E–G–1 to improved register, to correct this assembly, pin-points the highly rated value of a reverse cycle tape as a coordinating influence with the help of axis rotation; and particularly because 18 positions are available in the periphery of D–E–G–1 for examination. If this particular assembly were used for scheduling, positions would be reduced to 14 which is normal for an 8 club schedule.

Figure 3:
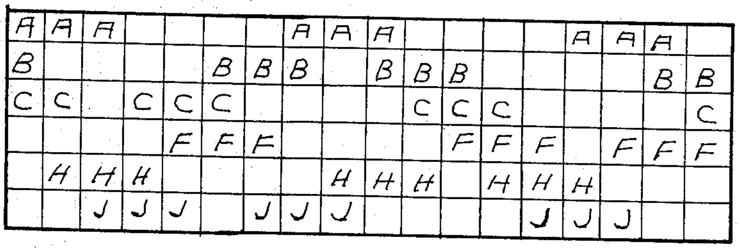

FIG. 3 shows a further basic tape that uses 6 horizontal rows of symbols namely A–B–C–F–H–J, but with a 4–4–1 spacing which gives better repetitive appeal than either FIG. 1 or FIG. 2. This is also extended to 18 positions and is integrated to have three symbols present in each vertical position or half the number of symbols employed. Symbols occur in groups of 3 for *Home* series as before.

Figure 4:
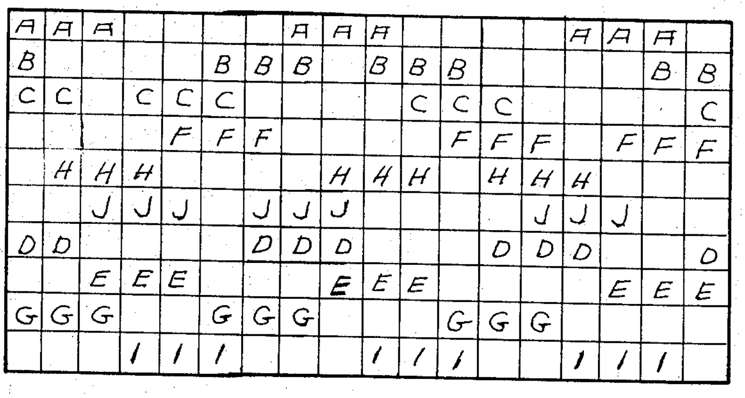

FIG. 4 shows the reverse tape in FIG. 2 used in combination with tape in FIG. 3 for a 10-club schedule. #4 position of FIG. 2 is paired with #1 position of FIG. 3. Position #4 of FIG. 2 is selected for this spot due to high rating as a coordinating influence mentioned above.

The combined information described in FIGS. 1, 2, 3 and 6 together with the application of basic tapes to circular model is now made use of in the model developed as a scheduling machine. Each row of each basic tape in FIG. 4 is now applied individually to a cylinder for better vertical placement; but maintain relative vertical register shown in FIG. 4.

The scheduling is adapted for 1966 National League and position #9 in FIG. 4 is selected for front position in scheduling machine assembly. The reason for this selection will be explained later.

The listing on tapes of FIG. 4, of course, only show the home appearance; and now, by transferring tapes to individual cylinders, the itinerary of visiting clubs dictate the proper elevation of each cylinder in the cylindrical pile. The itinerary starts with plotting A first; and for geographic accommodation the jump schedule is limited to 5 symbols. Thus A (San Francisco) would be limited to F (Cincinnati) or mid-west area. This will be explained later.

When itinerary for A is completed, B–J and I are next completed in that order. The plotting first of these four (2 Atlantic and 2 Pacific Coast Clubs) with preferred vertical placements and cylinders establishes an accepted pattern, into which the balance of symbols fall into respective place in periodic fashion and with ease, much the same as the latter pieces of a jig-saw puzzle when guide lines of first half are properly placed. The final vertical placement of all cylinders is shown in FIG. 7.

The basis of a 10 club schedule is now established and the vertical pile of cylinders is now locked in permanent register with locking pin; and to stay in this fixed position for desirable scheduling. This locking of course, is made after cylinder J is keyed to axis as shown in FIG. 5.

The symbols in each position can represent 2, 3 or 4 game series as desired. The 18 positions on periphery of cylinder complete a cycle, as spelled out in scroll view, shown in FIG. 8 and will be identified later as a *Period* of the season. Three periods will constitute the entire season. The length of period can be of 36, 54 or 72 games as desired.

Figure 5:
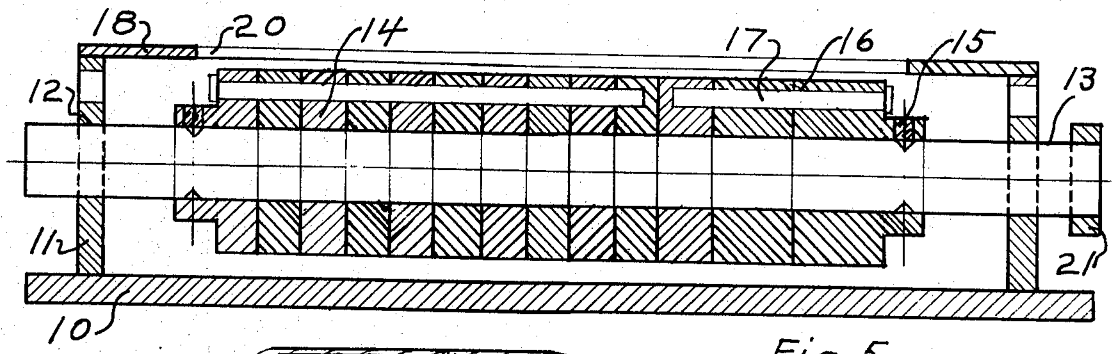
FIG. 5 is an axial cross section of a scheduling machine.
Figures 7, 8:
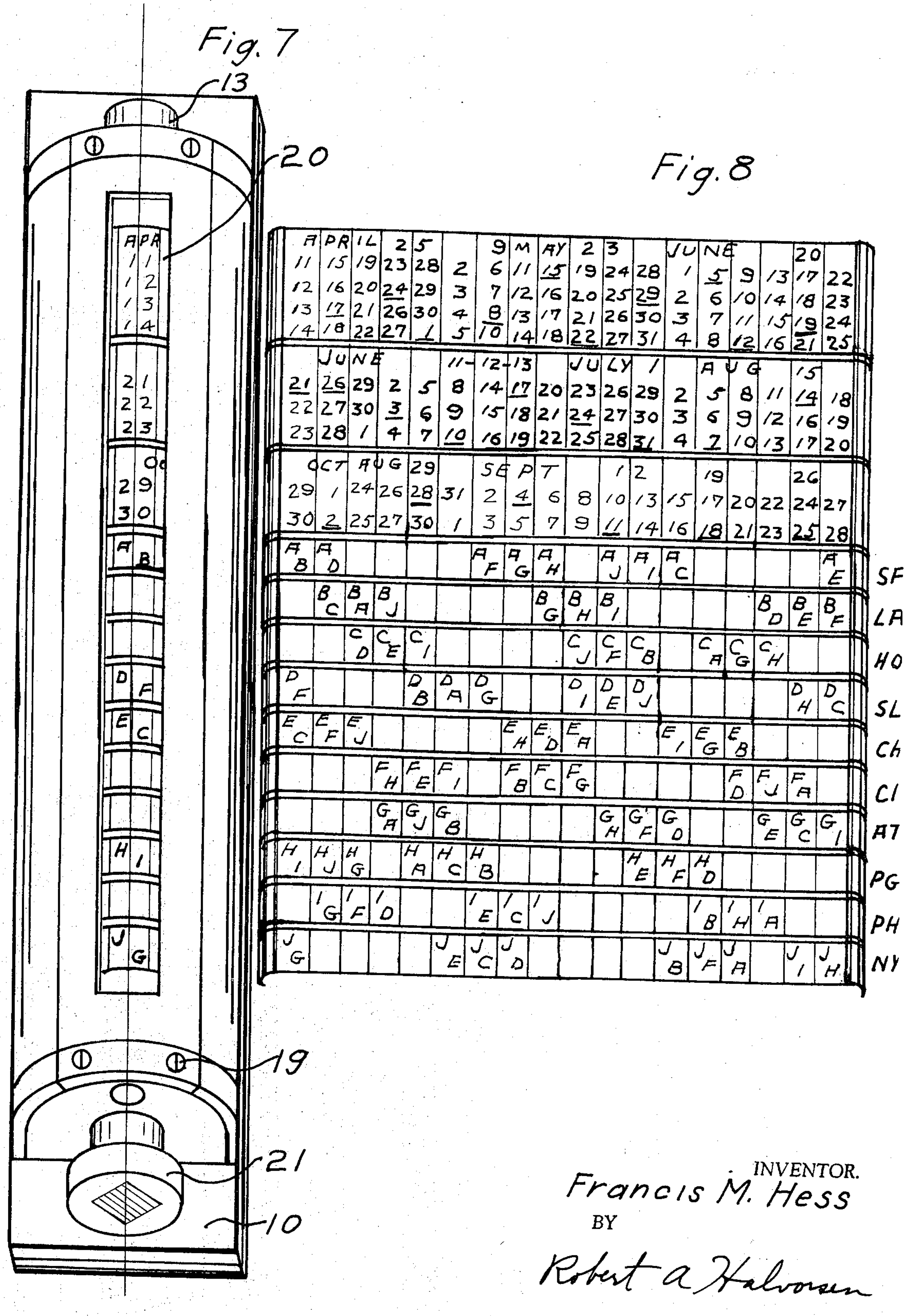
FIG. 7 is an isometric top view of the scheduling machine.
FIG. 8 is a development of the numerals appearing on the various cylinders of the scheduling machine.

The details of construction of the scheduling machine are shown in FIGS. 5, 6 and 7, which show a base 10 from which projects two end supports 11, each of which has a hole 12 adapted to rotatably support a shaft 13.

A series of closely spaced cylinders 14 are mounted for rotation on shaft 13. Set screws 15 are provided in the cylinder 14 at each end of the series for locking said end cylinders with respect to shaft 13.

When the series of cylinders 14 have been manually adjusted to the desired relative angular relationship a hole 16 is drilled through the series of cylinders, and a pin 17 is fitted into said hole to prevent subsequent change in the relative angular relationship of the series of cylinders.

FIG. 5 shows one pin 16 fitted into each end of the series of cylinders, one pin to lock the orientation assembly, the other pin locking the scheduling assembly.

A cover plate 18 is fastened by screws 19 to the upper surfaces of end supports 11. Cover plate 17 has an elongated slot 20 parallel with the axis of the cylinder, to provide a viewing aperture through which can be read a series of letters and numbers printed on the cylinders.

A knob 21 is provided on an extension of shaft 13 beyond end support 11 for convenience in rotating the series of cylinders for viewing various series of indicia.

The scheduling machine is adapted for the addition of orientation cylinders. Three cylinders are employed; one for each of the periods that aggregate the season play. A calendar type is made and applied to each respective cylinder and respectively for 36, 54 and 72 scheduled dates. Open dates are pre-selected and no spacing is assigned to the open dates. This, of course, is done for charting convenience.

A survey is made as before for accommodation such that each club has a proper share of Sunday and holiday home games. To do this, each orientation cylinder is rotated individually (clockwise) on axis, independent of locked schedule assembly for periodic inspection in each position, until successive inspection approves satisfactory adaptation. When this is completed, the orientation cylinders are locked together with locking pins after the April cylinder is keyed to shaft, but the orientation assembly is never locked to the scheduling assembly. This completes the scheduling machine organization.

Thus, with all cylinders locked together in proper registry, the season play can be scheduled by turning the control knob clockwise (top view) for successive playing dates on the respective orientation cylinder. One complete revolution represents one *Period* of play; and three times around for a complete season of play.

DESCRIPTION

In the explanation of the charts, only a partial explanation was made; therefore, a further description will now be added. On the use of the machine, a number of new and valuable innovations are reduced to routine operation. Some of these can be ear-marked as year to year occurrence. Innovations as follows:

*Period designation.*—It is a marked improvement to divide and play each portion of the season as a complete unit of play within itself. That is, each club plays every other club, the same number of home games, and the same number of road games.

*Number and length of period.*—The season can be divided if machine scheduling is used, into two or more periods. The periods can be of equal length or unequal length as desired. The listing in this disclosure includes three periods of unequal length.

*Contention play.*—In the use of the machine any of 18 positions on the cylinders can be chosen as the starting position. This selection will change from year to year, depending on the order of finishing in the previous season. The listing on machine uses position #9 (on FIG. 4) as the starting position, as shown in FIG. 7. #9 was chosen so that contention clubs (those finishing 1, 2, 3, 4, and 5 at close of '65 season) are in direct competition one with another at the close of the '66 season. This refinement has never been included before, and is one of the best moves possible to intensify public interest right up to the last day of the season. As a matter of fact, the machine automatically includes this refinement at the close of each *period.*

*Calendar orientation.*—For the '67 season or any season thereafter, only the orientation cylinders need replacing. The new cylinders can be plotted with any of the 18 positions available for preferred starting selection; and this of course would be adapted to suit contention play as the previous season dictates.

*Traveling convenience.*—It is new and a distinct advantage to have each and all series play, end simultaneously on the same day. This assures equal travelling requirements for all clubs. This affords maximum travelling economy; and makes possible combination travelling, such as two or more clubs sharing the same plane or trains. The machine scheduling principle also makes possible reduced travel jumps. This is a geographic accommodation, which is not recognized in present major league schedules. It is common practice now for clubs to make coast to coast jumps, and numerous other long jumps are also included. On the machine scheduling to and from the west coast, (where distances between member cities are much longer) the jumps are limited to 5 symbol jumps, or *half* the distance from coast to coast; and only a scattered few of these are required. The bulk of jumps are much less.

*Open dates.*—All open dates are shared simultaneously by all clubs. This is a new innovation and very desirable; and particularly useful in re-scheduling of postponed games. Additional open-dates at present are arrived at, by promoting double-headers for week-end attendance stimulus. This same privilege can be employed under machine scheduling; but with greater ease, because all clubs are available on the same day.

CONCLUSION

The use of a machine as described above, as a guide to better scheduling presents a radical departure from the accepted practice now employed. The use of the round surface of cylinders to develop a closed cycle feature is a natural means for dividing the season into several balanced units or periods of competition. Each of the several selected elements for use in the closed cycle feature, play an important part in the above combinations.

This disclosure represents a careful selection of charted information gleaned from these combinations, and this information is planned to function later as a storehouse of reference memory. The symbols used in the basic elements employed are fed into this organization, must the same as facts and figures are fed into a computer for later confirmation. Circular motion is also employed to implement the integration and accumulate the results. The sequence of steps used in successive fashion is regulated to obtain a desirable register in the final assembly. Then, all this information is locked in permanent register, and is available for instant recall by the periodic thumbing of a tuning dial.

I claim as my invention:

1. A device for baseball scheduling or the like, which comprises a plurality of basic tapes, each having horizontal rows of symbols related in a predetermined manner with respect to their vertical placement, the number of symbols in each row being half the number of rows, said vertical placement following a cyclical pattern relating to the number of teams, each of said tapes being of the same length and mounted respectively on the surface of a cylinder, said cylinders having the same diameter, said cylinders being mounted concentrically for individual relative rotation with respect to each other.

2. The device according to claim 1, including additional tapes including calendar information mounted on cylinders coaxial with the basic tape cylinders.

References Cited

UNITED STATES PATENTS

| | | | |
|---|---|---|---|
| 483,138 | 9/1892 | Covington. | |
| 630,855 | 8/1899 | Brooks | 40—68 |
| 3,238,652 | 3/1966 | Eaton | 35—77 |

EUGENE R. CAPOZIO, Primary Examiner

W. J. CONTRERAS, Assistant Examiner

U.S. Cl. X.R.

40—107